US009835454B2

(12) United States Patent
Lloyd

(10) Patent No.: US 9,835,454 B2
(45) Date of Patent: Dec. 5, 2017

(54) HIGH-Q MEMS GYROSCOPE

(71) Applicant: InvenSense, Inc., San Jose, CA (US)

(72) Inventor: Stephen Lloyd, Los Altos, CA (US)

(73) Assignee: INVENSENSE, INC., San Jose, CA (US)

( * ) Notice: Subject to any disclaimer, the term of this patent is extended or adjusted under 35 U.S.C. 154(b) by 52 days.

(21) Appl. No.: 14/617,391

(22) Filed: Feb. 9, 2015

(65) Prior Publication Data
US 2016/0231117 A1    Aug. 11, 2016

(51) Int. Cl.
G01C 19/5776 (2012.01)
G01C 19/56 (2012.01)
G01C 19/5719 (2012.01)
G01C 19/5614 (2012.01)
G01C 19/5726 (2012.01)

(52) U.S. Cl.
CPC ..... *G01C 19/5719* (2013.01); *G01C 19/5614* (2013.01); *G01C 19/5726* (2013.01); *G01C 19/5776* (2013.01)

(58) Field of Classification Search
CPC ............ G01C 19/5776; G01C 19/5762; G01C 19/5726; G01C 19/5614; G01C 19/574; G01C 19/5656; G01C 19/5719
USPC .............................. 73/504.12, 504.04, 504.16
See application file for complete search history.

(56) References Cited

U.S. PATENT DOCUMENTS

| 2009/0031807 A1* | 2/2009 | Sugibayashi | G01C 25/00 73/504.16 |
| 2009/0084180 A1* | 4/2009 | Yoshida | G01F 1/8431 73/504.02 |
| 2011/0100121 A1* | 5/2011 | Wyse | G01C 19/5656 73/504.12 |
| 2012/0167680 A1* | 7/2012 | Hwang | G01C 19/5776 73/504.12 |
| 2012/0191398 A1* | 7/2012 | Murakami | G01C 19/5776 702/99 |
| 2012/0326700 A1* | 12/2012 | Swanson | G01P 15/097 324/76.11 |
| 2013/0068019 A1* | 3/2013 | Takase | G01C 19/56 73/504.12 |
| 2013/0283908 A1* | 10/2013 | Geen | G01C 19/574 73/504.12 |

(Continued)

FOREIGN PATENT DOCUMENTS

WO    2014006437 A1    1/2014

OTHER PUBLICATIONS

Int'l Search Report and Written Opinion for PCT/US2016/015036 dated Jul. 4, 2016 (20 pages).

*Primary Examiner* — Helen Kwok
(74) *Attorney, Agent, or Firm* — Maynard Cooper & Gale, LLP; Joshua V. Van Hoven, Esq.

(57) ABSTRACT

A system and/or method for efficiently operating a MEMS gyroscope without drive circuitry and/or with drive circuitry and a non-constant oscillating amplitude. In a non-limiting example, drive circuitry may be utilized to drive the MEMS gyroscope proof mass to a desired oscillating amplitude, and then the drive circuitry may be powered off. Rotational velocity may be sensed while the proof mass is being driven to a desired oscillating amplitude, while the proof mass is being maintained at a desired oscillating amplitude, and/or while the proof mass amplitude decays.

23 Claims, 6 Drawing Sheets

(56) References Cited

U.S. PATENT DOCUMENTS

2014/0144230 A1* 5/2014 Magnoni ............... G01C 19/56
                                                     73/504.12
2014/0305206 A1   10/2014 Maki et al.
2015/0090034 A1*  4/2015 Zhang ............... G01C 19/5776
                                                     73/504.12
2015/0153174 A1*  6/2015 Kim ................. G01C 19/5776
                                                     73/504.12

* cited by examiner

HIGH-Q MEMS GYROSCOPE

CROSS-REFERENCE TO RELATED APPLICATIONS/INCORPORATION BY REFERENCE

[Not Applicable]

FEDERALLY SPONSORED RESEARCH OR DEVELOPMENT

[Not Applicable]

SEQUENCE LISTING

[Not Applicable]

MICROFICHE/COPYRIGHT REFERENCE

[Not Applicable]

BACKGROUND

MEMS gyroscopes are substantial consumers of energy. For example, MEMS gyroscopes generally rely on relatively high-quality and high-power drive circuitry to maintain the proof mass oscillating amplitude at a constant target amplitude, while sensing circuitry detects rotational velocity. MEMS gyroscopes often utilize a substantial amount of energy to drive the proof mass to the desired oscillating amplitude and to maintain the proof mass at the desired oscillating amplitude while sensing rotational velocity. Limitations and disadvantages of conventional methods and systems for operating MEMS gyroscopes will become apparent to one of skill in the art, through comparison of such approaches with some aspects of the present methods and systems set forth in the remainder of this disclosure with reference to the drawings.

SUMMARY

Various aspects of this disclosure comprise a system and/or method for efficiently operating a MEMS gyroscope without drive circuitry and/or with drive circuitry and a non-constant oscillating amplitude. In a non-limiting example, drive circuitry may be utilized to drive the MEMS gyroscope proof mass to a desired oscillating amplitude, and then the drive circuitry may be powered off. Rotational velocity may be sensed while the proof mass is being driven to a desired oscillating amplitude, while the proof mass is being maintained at a desired oscillating amplitude, and/or while the proof mass amplitude decays.

DETAILED DESCRIPTION OF VARIOUS ASPECTS OF THE DISCLOSURE

As utilized herein the terms "circuits" and "circuitry" refer to physical electronic components (i.e., hardware) and any software and/or firmware ("code") that may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set {(x), (y), (x, y)}. That is, "x and/or y" means "one or both of x and y." As another example, "x, y, and/or z" means any element of the seven-element set {(x), (y), (z), (x, y), (x, z), (y, z), (x, y, z)}. That is, "x, y, and/or x" means "one or more of x, y, and z." As utilized herein, the terms "e.g.," "exemplary," "for example," and the like set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled, or not enabled (e.g., by a user-configurable setting, factory trim, etc.).

The discussion will now turn to presenting various aspects of the present disclosure by way of various non-limiting examples. It should be noted that the scope of the present disclosure should not be limited by any specific characteristics of the examples presented herein.

Figure 1A:
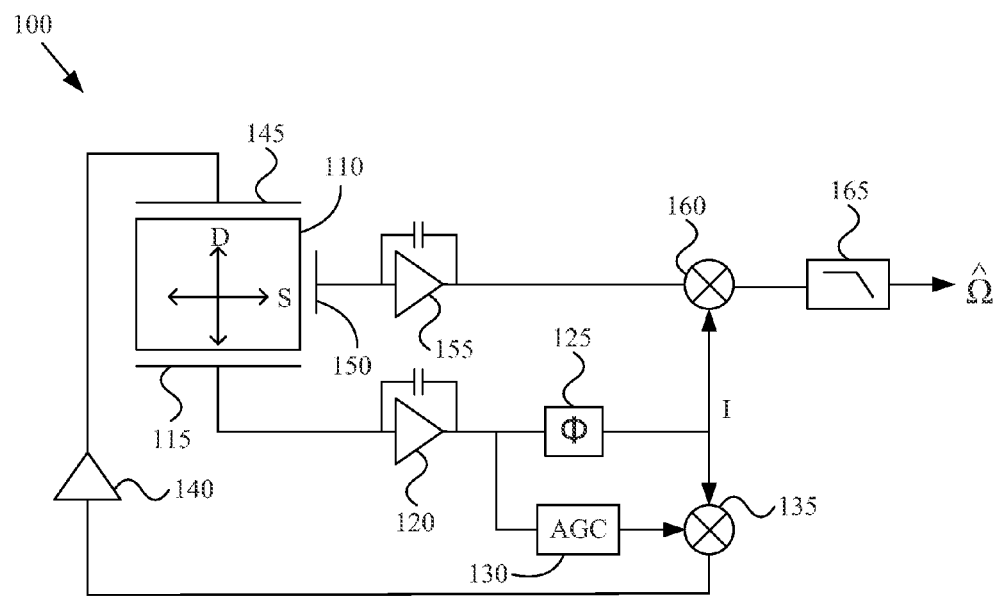
FIG. 1A shows an example block diagram of a MEMS Gyroscope circuit, in accordance with various aspects of the present disclosure.

FIG. 1A shows an example block diagram of a MEMS Gyroscope circuit 100, in accordance with various aspects of the present disclosure. The circuit 100 comprises a mass 110, which may also be referred to herein as a proof mass 110, which is driven in a vibratory or oscillatory manner in the drive direction, labelled "D" in FIG. 1. The drive circuitry may, for example, comprise a drive sensor 115 (e.g., a capacitive sensor or other type of sensor), a drive sense amplifier 120, a phase detector 125, an automatic gain control (AGC) circuit 130, a drive mixer 135, a drive amplifier 140, and a drive element 145 (e.g., an electrostatic drive element). The drive sensor 115 may, for example, sense movement of the proof mass 110 in the drive direction "D" and output a drive sense signal indicative of the sensed drive motion of the proof mass 110. The drive sense amplifier 120 may then amplify the drive sense signal provided by the drive sensor 115, and provide the amplified drive sense signal to the phase detector 125 and the AGC circuit 130. The phase detector 125 outputs an in-phase signal "I" (which is in phase with the drive signal) to the drive mixer 135 for mixing with the output of the AGC circuit 130 to generate a drive signal. The drive signal is then amplified by the drive amplifier 140 and provided to the drive element 145, which generates the force (e.g., electrostatic force) to vibrate the proof mass 110.

Though not illustrated in FIG. 1A, the phase detector 125 may, for example, be replaced by an oscillator (e.g., phase lock loop, etc.), which is set to the drive frequency. Such replacement may, for example, be implemented by switching in the oscillator and switching out the phase detector 125. The output of such an oscillator may, for example, be utilized by the sense mixer 160 to demodulate the sense signal output by the Coriolis sense amplifier 155, as discussed elsewhere herein. Such a configuration may, for example, allow the drive sense amplifier 120 to be turned off when the drive loop is not driving the proof mass, while still providing a demodulation reference for the sense mixer 160 of the Coriolis sense path.

The circuit 100 may also, for example, comprise a Coriolis sensor 150, a Coriolis sense amplifier 155, a sense mixer 160, and a low-pass filter 165. The Coriolis sensor 150 may, for example, sense movement of the proof mass 110 in the sense direction "S" and output a Coriolis sense signal indicative of the sensed motion of the proof mass 110. The sense signal output from the Coriolis sensor 150 will generally, for example, comprise a composite signal that includes a signal indicative of the Coriolis force caused by rotation of the gyroscope and also a quadrature signal. The quadrature signal may, for example, be proportional to the drive amplitude and independent of rotation of the gyroscope. The Coriolis sense amplifier 155 may then amplify the Coriolis sense signal provided by the Coriolis sensor 150, and provide the amplified Coriolis sense signal to the sense mixer 160. The sense mixer 160 also receives the in-phase signal output by the phase detector 125. The sense mixer 160 mixes the in-phase signal and the amplified Coriolis sense signal to generate a signal with the quadrature components removed. The output of the sense mixer 160 is then filtered by low-pass filter (LPF) 165 and output as a signal $\hat{\Omega}$, which is indicative of the angular velocity at which the gyroscope is being rotated.

As mentioned herein, the signal output by the Coriolis sensor 150 may generally comprise a composite signal that comprises a signal component indicative of the Coriolis force, which is due to gyroscope rotation, and a quadrature component, which is generally due to imperfections in the gyroscope (e.g., imperfections in the proof mass 110, coupling of the proof mass 110, capacitive sensors, alignment of sensors to the proof mass 110, etc.). See, for example, Equation 1:

$$S \alpha D(\omega \Omega \sin(\omega t) + \text{Quad} \cos(\omega t))$$  Equation 1

In Equation 1, the sense signal S is proportional to the drive amplitude D times an in-phase factor and a quadrature-phase factor. The in-phase factor may, for example, comprise the frequency of the drive oscillation, $\omega$, times the angular rotation of the gyroscope, $\Omega$, times $\sin(\omega t)$. The quadrature-phase factor may, for example, comprise a quadrature factor, Quad, times $\cos(\omega t)$.

Generally, such quadrature signals are undesirable and have a substantial magnitude relative to the desirable Coriolis-based signals. Accordingly, efforts have been made, and are continuing to be made, to reduce and/or eliminate quadrature signals. See, for example, commonly owned U.S. Pat. No. 7,290,435, titled "Method and Apparatus for Electronic Cancellation of Quadrature Error," filed Feb. 6, 2006, the entirety of which is hereby incorporated herein by reference. In accordance with various aspects of this disclosure, however, quadrature signals may be utilized to beneficially reduce power consumption of gyroscope circuits. For example, quadrature signals may be utilized to determine drive amplitude.

As indicated in Equation 1, the sense signal S is proportional to the drive amplitude. The sense amplifier circuit 155 may, for example, operate with a constant gain that is set to correspond to an expected drive amplitude. In such an implementation, gyroscope sensing might generally only be performed when the gyroscope proof mass 110 is oscillating at the expected amplitude. Such operation is graphically depicted in FIG. 1B, which shows an example plot 170 of a MEMS gyroscope proof mass (e.g., the proof mass 110) oscillating amplitude as a function of time, in accordance with various aspects of the present disclosure.

At time $t_0$, a decision is made to begin utilizing the MEMS gyroscope. To save energy, however, the gyroscope proof mass 110 is not continually driven. Accordingly, once the decision is made to utilize the gyroscope, the proof mass 110 is driven up to a desired amplitude. Thus, at time $t_0$, the drive loop (e.g., comprising the AGC circuit 130 and drive amplifier 140) begins to drive the MEMS gyroscope proof mass 110 into oscillation. The oscillation amplitude ramps up until time $t_1$, at which time the amplitude reaches the target amplitude $D_t$. At time $t_1$, the oscillation amplitude thus reaches the point, $t_{start}$, at which Coriolis sensing may begin.

From time $t_1$ to time $t_2$, the proof mass oscillation amplitude is maintained at $D_t$, and Coriolis sensing continues. At time $t_{stop}$, a decision is made to stop utilizing the MEMS gyroscope. Thus, at time $t_2$, the drive loop is turned off, and the amplitude of the proof mass oscillation is allowed to decay in accordance with its natural decay characteristics. At time $t_3$, the proof mass oscillation amplitude reaches a state of zero, or negligible amplitude.

Figure 1B:
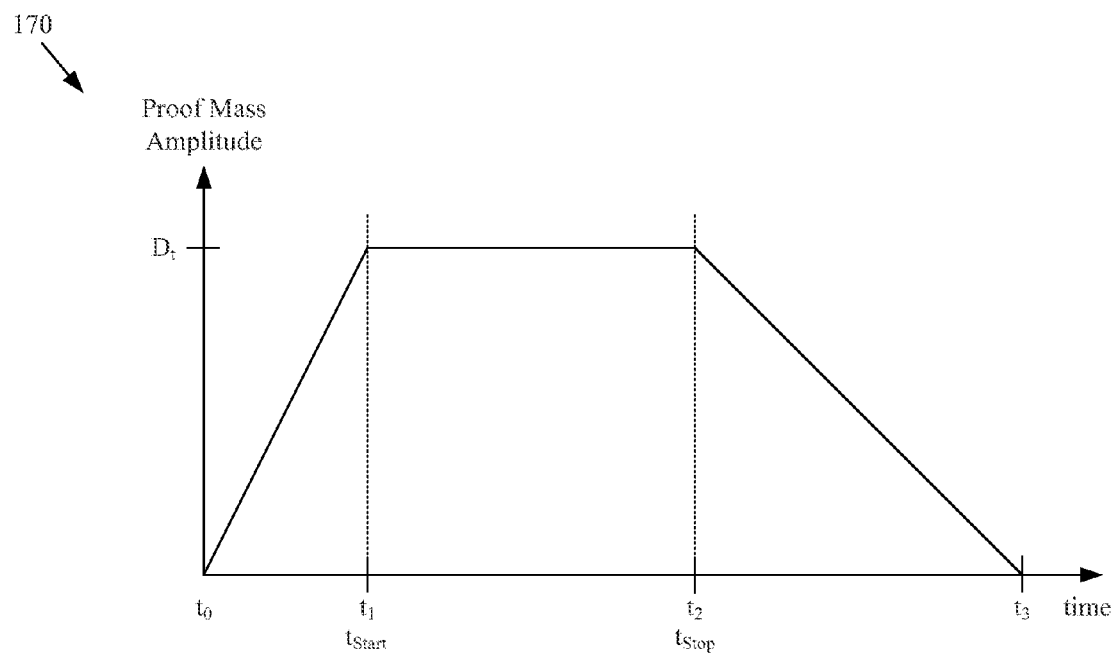
FIG. 1B shows an example plot of a MEMS Gyroscope proof mass oscillating amplitude as a function of time, in accordance with various aspects of the present disclosure.

As shown in FIG. 1B, and as evidenced from the example scenario discussed above, during the time period from $t_0$ to $t_1$, the circuit 100 is utilizing energy to drive the gyroscope proof mass 110, but is not performing useful Coriolis sensing. Even though, in a first portion of the time period, the oscillation amplitude might be too low to adequately perform Coriolis sensing, in a second portion of the time period, the oscillation amplitude is high enough to adequately perform Coriolis sensing. Operation in such second portion of the time period, in which energy is being utilized to drive the proof mass 110, the oscillation amplitude is high enough to perform useful Coriolis sensing, and yet no Coriolis sensing is being performed, is wasteful of energy.

Additionally, during the time period from $t_2$ to $t_3$, at least during a first portion of such time period, the oscillation amplitude is high enough to perform useful Coriolis sensing, yet no Coriolis sensing is being performed. Operating in such a time period, in which energy was utilized to drive the proof mass 110 into the desired oscillation, the oscillation amplitude is high enough to perform useful Coriolis sensing, and yet no Coriolis sensing is being performed, is wasteful of energy. In other words, by not performing Coriolis sensing in at least a first portion of the time period from $t_2$ to $t_3$, the circuit 100 is not making the most out of the energy expended to drive the proof mass 110 up to speed.

Figure 2A:
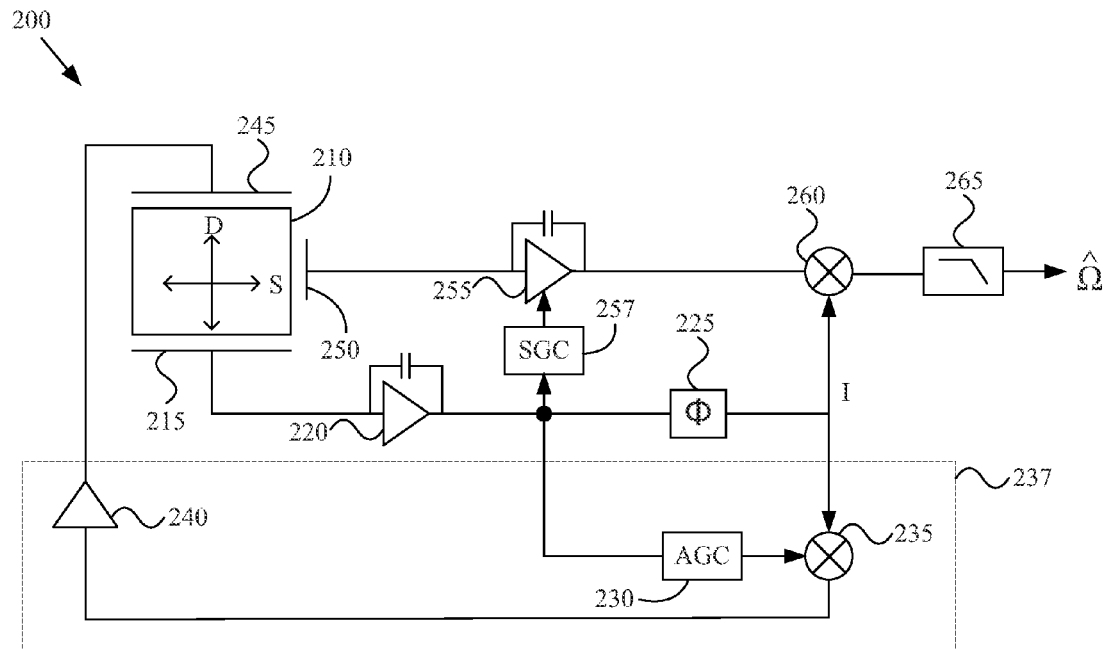
FIG. 2A shows an example block diagram of a MEMS Gyroscope circuit that utilizes drive and sense control, in accordance with various aspects of the present disclosure.

FIG. 2A shows an example block diagram of a MEMS Gyroscope circuit 200 that utilizes drive and sense control, in accordance with various aspects of the present disclosure. The example circuit 200 may, for example, share any or all characteristics with the example circuit 100 shown in FIG. 1A and discussed herein. For illustrative clarity, the following discussion will generally focus on the differences between the example circuit 200 and the example circuit 100.

The example circuit 200 comprises an Automatic Gain Control (AGC) circuit 230. The AGC circuit 230 may, for example, share any or all characteristics with the AGC circuit 130 of FIG. 1A. The AGC circuit 230 may, for example, operate to maintain the oscillating amplitude of the MEMS gyroscope proof mass between a minimum amplitude and a maximum amplitude.

Figure 2B:
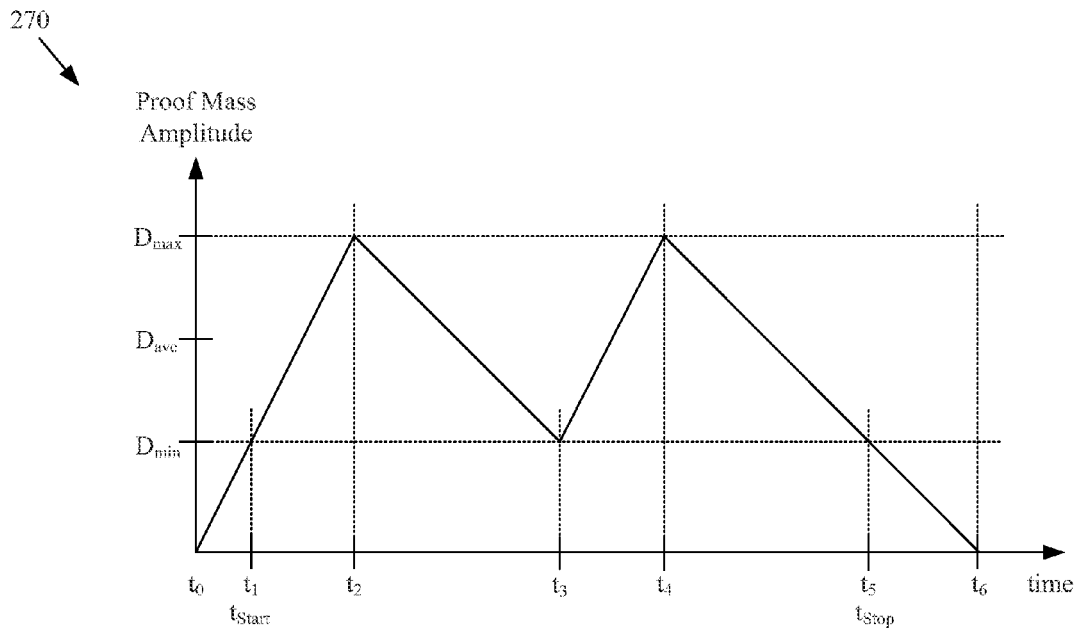
FIG. 2B shows an example plot of a MEMS Gyroscope proof mass oscillating amplitude as a function of time, in accordance with various aspects of the present disclosure.

FIG. 2B shows an example plot 270 of a MEMS gyroscope proof mass (e.g., the proof mass 210 or the proof mass 110) oscillating amplitude as a function of time, in accordance with various aspects of the present disclosure. Referring to FIGS. 2A and 2B together, at time $t_0$, a decision is made to utilize the MEMS gyroscope. To save energy, however, the gyroscope proof mass 210 is not continually driven. Accordingly, once the decision is made to utilize the gyroscope, the proof mass 210 is driven up to a desired amplitude. Thus, at time $t_0$, the drive loop 237 (e.g., comprising the AGC circuit 230, drive amplifier 240, etc.) begins to drive the MEMS gyroscope proof mass 210 into oscillation. The oscillation amplitude ramps up until time $t_1$, at which time the amplitude reaches a minimum acceptable amplitude $D_{min}$ for reliable gyroscope measurements. At time $t_1$, the oscillation amplitude thus reaches the point, $t_{start}$, at which Coriolis sensing may begin.

In this example scenario, the oscillation amplitude continues to ramp up until time $t_2$, at which time the amplitude reaches a maximum amplitude $D_{max}$ for sensing. Rather than maintaining the proof mass oscillation at an exact desired amplitude, at time $t_2$, the proof mass drive loop (e.g., the AGC 230, the drive amplifier 240, etc.) is turned off (e.g., powered down or off), and the amplitude of the proof mass oscillation is allowed to decay. Alternatively for example, a smaller amount of drive energy may be utilized to slow the decay. The oscillation amplitude decays until reaching $D_{min}$, at which time, if continued use of the gyroscope is desired, the drive circuitry may be utilized to drive the oscillation amplitude back up toward $D_{max}$. Note that the decision to discontinue utilization of the gyroscope may be made at any time, resulting in discontinuing the Coriolis sensing, and turning off the drive circuitry or keeping off the drive circuitry.

Notably, during the time period between $t_2$ and $t_3$, Coriolis sensing is performed, even though the gyroscope proof mass is not being driven, or alternatively is being driven at a level that allows the amplitude of the proof mass oscillation to decay. This provides a substantial energy savings relative to tightly maintaining the proof mass oscillation amplitude at a precise expected level. As discussed herein, the drive sense amplifier 220 may remain operational, even when other drive components (e.g., any one or more of the AGC 230, drive amplifier 240, mixer 235, etc.) may be turned off or down. In an alternative configuration, as discussed herein with regard to FIG. 1A, an oscillator may be utilized (e.g., instead of the phase detector 225) to provide a demodulation reference for the sense mixer 260 of the Coriolis sense path.

In the example illustrated at FIG. 2B, the oscillation amplitude reaches $D_{min}$ at time $t_3$. The decision is made at time $t_3$ to continue to utilize the gyroscope, the drive circuitry is controlled to drive the oscillation amplitude of the proof mass 210 back up toward $D_{max}$, and Coriolis sensing continues.

In this example scenario, the amplitude of the proof mass oscillation continues to ramp up until time $t_4$, at which time the amplitude again reaches a maximum amplitude $D_{max}$ for sensing. Rather than maintaining the amplitude of the proof mass oscillation at an exact desired amplitude, at time $t_4$, the proof mass drive loop is turned off, or alternatively powered down, and the amplitude of the proof mass oscillation is allowed to decay. Alternatively for example, a smaller amount of drive energy may be utilized to slow the decay. The oscillation amplitude decays until reaching $D_{min}$, at which time, if continued use of the gyroscope is desired, the drive circuitry may be utilized to drive the amplitude back up toward $D_{max}$.

In the example illustrated at FIG. 2B, the oscillation amplitude reaches $D_{min}$ at time $t_5$. The decision is made at (or before) time $t_5$ to stop utilizing the gyroscope, Coriolis sensing is stopped (labeled $t_{stop}$), the drive circuitry is kept off, and the proof mass oscillation amplitude is allowed to naturally decay to zero. Note that Coriolis sensing may be stopped at any point. In other words, $t_{stop}$ may occur at any point along the time axis after $t_{start}$.

In this example, since the oscillation amplitude is varying between $D_{min}$ and $D_{max}$ about an average amplitude $D_{ave}$, instead of being maintained at a steady state expected amplitude (e.g., like $D_t$ in FIG. 1B), the sense signal S output from the Coriolis sensor 250 may comprise an amplitude component that varies in proportion to the varying oscillation amplitude D (See, e.g., Equation 1). To compensate for (or cancel) this time-varying amplitude component, the Sensing Gain Control (SGC) module 257 may, for example in accordance with a signal received from the drive sense amplifier, determine a sense gain for the Coriolis sense amplifier 255. The sense gain may, for example, be inversely proportional to the time-varying proof mass oscillation amplitude. For example, if the proof mass oscillating amplitude is at the target value, then the SGC module 257 may direct the Coriolis sense amplifier 255 to amplify at the target amplification level. Also for example, if the proof mass oscillating amplitude is at half the target value, then the SGC module 257 may direct the Coriolis sense amplifier 255 to amplify at twice the target amplification level. Similarly for example, if the proof mass oscillating amplitude is at 1.2 times the target value, then the SGC module 257 may direct the Coriolis sense amplifier 255 to amplify at 1/1.2 times the target value.

As shown in FIG. 2B, the oscillation amplitude of the proof mass may be characterized by a duty cycle. Though the illustrated duty cycle is shown to be approximately ⅓ driven and ⅔ decaying, the duty cycle may comprise any of a variety of characteristics. For example, the proof mass may be driven 50% of the time or less than 50% of the time. Also for example, the proof mass may be driven 25% of the time or less than 25% of the time. Other percentages are also possible and within the scope of the disclosure.

Figure 2C:
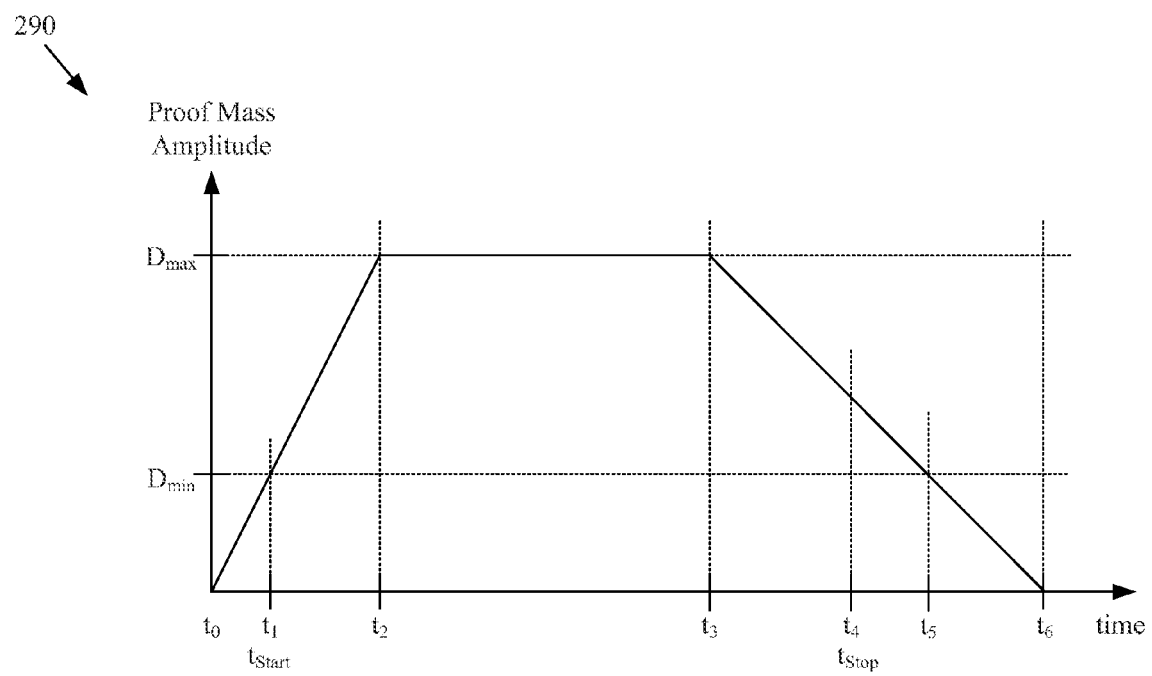
FIG. 2C shows an example plot of a MEMS Gyroscope proof mass oscillating amplitude as a function of time, in accordance with various aspects of the present disclosure.

The example proof mass oscillation amplitude plot presented in FIG. 2B is an example that comprises a generally sawtooth (or triangle) shape. Many alternative shapes also fall within the scope of this disclosure. For example, an example amplitude plot (or trajectory) may comprise any or all characteristics of the plot 170 of FIG. 1B and the plot 270 of FIG. 2B. FIG. 2C shows an example plot of an example MEMS Gyroscope proof mass oscillating amplitude as a function of time, in accordance with various aspects of the present disclosure. In this example, the amplitude of the gyroscope proof mass oscillation may comprise the general shape as illustrated in FIG. 1B, and comprise the general Coriolis sensing characteristics as shown in FIG. 2B.

For example, Coriolis sensing may begin at $t_{start}$ when the oscillation amplitude of the proof mass 210 reaches the minimum threshold $D_{min}$. Coriolis sensing may then proceed while the proof mass 210 is being driven to the desired amplitude in the time range from $t_1$ to $t_2$. When the oscillation amplitude reaches the desired point $D_{max}$, which may also be referred to as $D_{target}$, the drive circuitry may maintain the amplitude at the desired amplitude, and Coriolis sensing may continue during this period. At time $t_3$, for example, a decision may be made anticipating that use of the gyroscope is nearing completion, and the drive circuitry may be powered down (e.g., powered off or operated at a reduced voltage). Since utilization of the gyroscope still continues after time $t_3$, the Coriolis sensing continues while the oscillation amplitude of the proof mass decays to zero at time $t_6$. In the example shown in FIG. 2C, at time $t_4$, utilization of the MEMS gyroscope stops and the Coriolis sensing is turned off. Thus, in this example, Coriolis sensing occurs while the oscillation amplitude of the proof mass 210 is being driven up to a desired amplitude, while the oscillation amplitude of the proof mass 210 is being maintained at the desired amplitude, and while the oscillation amplitude of the proof mass 210 is decaying.

It should be noted that if the determination is made at time $t_5$, the point at which the proof mass oscillation amplitude reaches the minimum threshold $D_{min}$, that continued utilization of the gyroscope is desirable, then the drive circuitry may be utilized to drive the amplitude of the proof mass back up to $D_{max}$, or to some other usable level between $D_{min}$ and $D_{max}$, for continued Coriolis sensing.

Though the various blocks in FIGS. 1A and 2A are shown in electrical and/or electromechanical schematic form, it should be realized that any of such blocks may be implemented by a processor operating in accordance with software instructions. For example, logic circuitry may be implemented in explicit hardware and/or by a processor operating in accordance with software instructions, gain circuitry may be implemented in explicit analog or digital hardware and/or by a processor operating in accordance with software instructions, etc. As a non-limiting example, the SGC module 257 or any portion thereof may be implemented by a processor (e.g., a processor of a motion processing unit, an application processor of a device utilizing the circuitry 200, a processor of a remote networked server, etc.) operating in accordance with software instructions.

Figure 3:
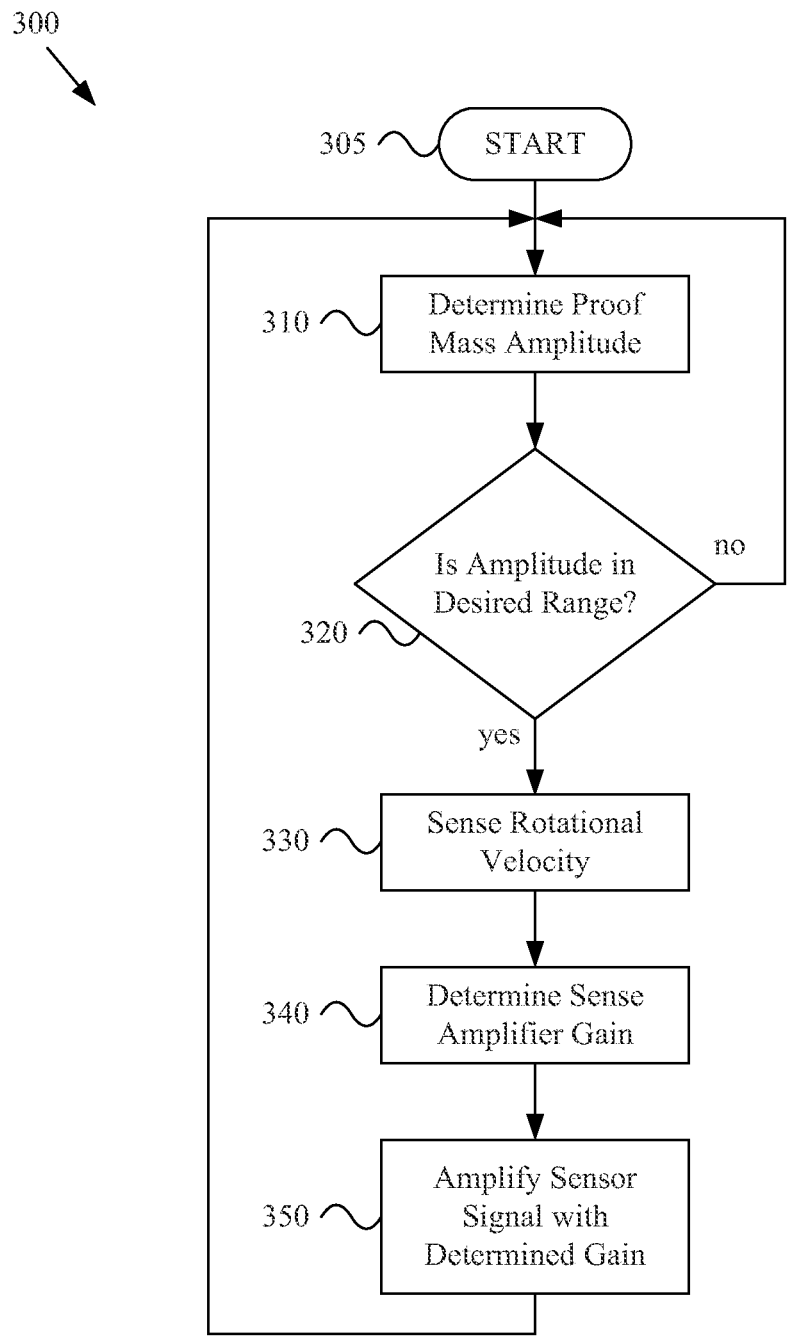
FIG. 3 shows a flow diagram of an example method for operating MEMS Gyroscope sense circuitry, in accordance with various aspects of the present disclosure.

As discussed in the examples herein, the gain of the Coriolis sense circuitry may be adjusted in a manner that is inversely proportional to the oscillation amplitude of the proof mass. Such operation is also presented by example in the flow diagram of FIG. 3. In particular, FIG. 3 shows a flow diagram of an example method 300 for operating MEMS Gyroscope sense circuitry, in accordance with various aspects of the present disclosure. The example method 300 may, for example, share any or all functional characteristics discussed herein, for example with regard to FIGS. 1-2. Any or all of the blocks of the method 300 may, for example, be implemented by any one or more of the components of the example MEMS gyroscope circuit 200 of FIG. 2 (e.g., the SGC module 257) or circuit 100 of FIG. 1.

The example method 300 starts at block 305. The example method 300 may begin executing in response to any of a variety of causes or conditions. For example, the method 300 may begin executing in response to an application and/or subroutine thereof beginning execution (e.g., executing in a sensor chip, in an application processor of an electronic device utilizing the gyroscope, etc.). The method 300 may also, for example, begin executing in response to a request received from a remote device (e.g., a networked server) via a communication network (e.g., via the Internet). The method 300 may additionally, for example, begin executing in response to a timer.

At block 310, the proof mass oscillation amplitude is determined. The proof mass oscillation amplitude may be determined in any of a variety of manners. For example, the proof mass oscillation amplitude may be determined by the drive sensor 215 and/or the drive sense amplifier 220. For example, even when the drive loop is shut off or turned down, the drive sense amplifier 220 may remain powered to determine proof mass oscillation amplitude. Also for example, the proof mass oscillation amplitude may be determined in the Coriolis sense path based on the quadrature component detected by the Coriolis sense path. As discussed herein, the quadrature component may be proportional to the proof mass oscillation amplitude. In such a scenario for example, the relationship between the proof mass oscillation amplitude and the magnitude of the quadrature component may be determined empirically (e.g., in a design lab, on a manufacturing line, in the field under known conditions, etc.) and/or theoretically and programmed into the circuit 200 (e.g. in memory of or memory accessible by the SGC module 257, which would then receive an input from the sense path, for example, from the Coriolis sensor 250).

At block 320, a determination is made whether the proof mass oscillation amplitude is in a desired range of operation. For example, if the amplitude is determined to be less than a minimum amplitude threshold (e.g., $D_{min}$), block 320 may determine that the amplitude has not yet reached a level at which Coriolis sensing may be performed reliably. For example, below the minimum amplitude threshold, a noise level may be too great (or too great in relation to other signal levels) to offer reliable Coriolis sensing results. If it is determined that the amplitude is not in the desired range, block 320 may direct execution flow of the method 300 back up to step 310, for continued amplitude determination and assessment. If it is determined, however, that the amplitude is in the desired range, block 320 may direct execution flow of the method 300 to block 330. Note that, as explained herein, the example method 300 may share any or all characteristics with other methods or functionality discussed herein. For example, block 310 and/or block 320 may pass amplitude information to, or receive amplitude information from, other method blocks discussed herein (e.g., proof mass drive control blocks).

At block 330, the Coriolis sense circuitry (e.g., utilizing one or more sense electrodes) detects rotational velocity. At block 340, the gain for the sense amplifier circuit (e.g., sense amplifier 255) is determined. As discussed herein, such determination may, for example, be based on the oscillation amplitude of the MEMS gyroscope proof mass. For example, the sense gain may, for example, be inversely proportional to the proof mass oscillation amplitude. For example, if the proof mass oscillating amplitude is at the target value, then block 340 may determine that the sense amplifier gain should be at the target amplification level. Also for example, if the proof mass oscillating amplitude is at half the target value, then block 340 may determine that the sense amplifier gain should be twice the target amplification level. Similarly for example, if the proof mass oscillating amplitude is at 1.2 times the target value, then clock 340 may determine that the sense amplifier gain should be at 1/1.2 times the target value.

Block 340 may also, for example, comprise utilizing a look-up table of proof mass oscillation amplitude versus sense amplifier gain. In such an example, implementation block 340 may comprise selecting an amplifier gain for any value within a range corresponding to the sense amplifier gain. Also for example, block 340 may interpolate between two gains in a look-up table to estimate the optimal sense amplifier gain.

At block 350, the sensed Coriolis signal may be amplified in accordance with the gain determined at block 340. Execution flow of the example method 300 may then, for example, return to step 310 for continued amplitude determination, gain determination, and amplification. Note that the method 300 may stop in response to any of a variety of causes or conditions. For example, it may be determined that the gyroscope is no longer needed (e.g., an application or subroutine thereof may end, a user may press an "off" button, an operating system may communicate a signal indicating that the gyroscope is no longer needed, a remote server may communicate a signal via a communication network indicating that the gyroscope is no longer needed, etc.).

Figure 4:
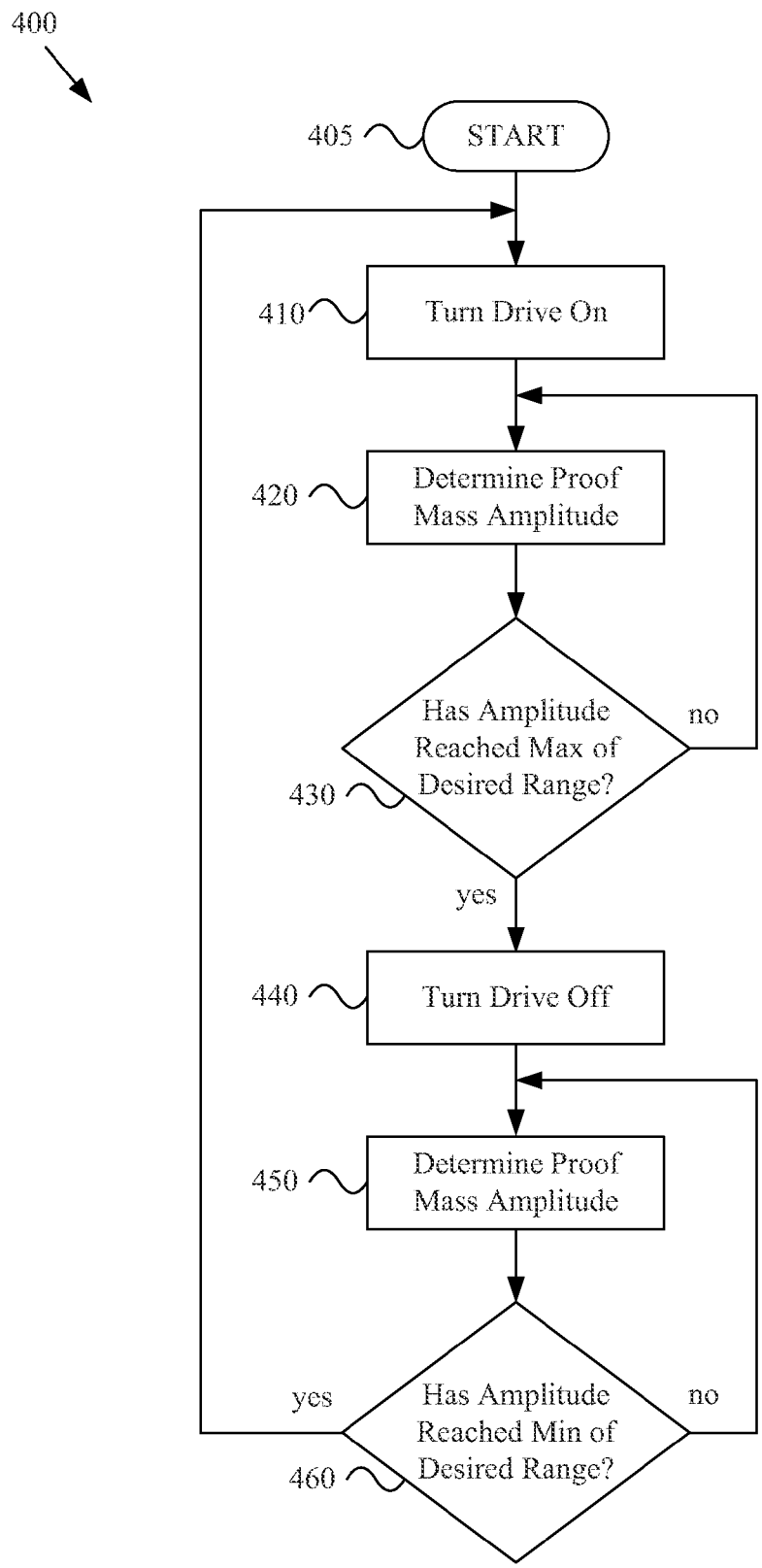
FIG. 4 shows a flow diagram of an example method for operating MEMS Gyroscope drive circuitry, in accordance with various aspects of the present disclosure.

In the discussion herein, the MEMS gyroscope proof mass may be driven in various manners, for example in which the oscillation amplitude varies. For example, the proof mass may be driven in a manner resembling a sawtooth or triangle, a clipped sawtooth or triangle, etc. An example of proof mass driving functionality is also presented in the flow diagram of FIG. 4. In particular, FIG. 4 shows a flow diagram of an example method 400 for operating MEMS Gyroscope drive circuitry, in accordance with various aspects of the present disclosure. The example method 400 may, for example, share any or all functional characteristics discussed herein, for example with regard to FIGS. 1-3 and/or any other methods or functionality. The example method 400 or any portion thereof may, for example, execute in parallel and/or in series with any of the functionality discussed herein. Any or all blocks of the method 400 may, for example, be implemented by any one or more of the components of the example MEMS gyroscope circuit 200 of FIG. 2 (e.g., the AGC circuit 230, drive amplifier 240, mixer 235, etc.) or circuit 100 of FIG. 1.

The example method 400 starts at block 405. The method 400 may begin executing in response to any of a variety of causes or conditions. For example, the method 400 may begin executing in response to an application and/or subroutine thereof beginning execution (e.g., executing in a sensor chip, in an application processor of an electronic device utilizing the gyroscope, etc.). The method 400 may also, for example, begin executing in response to a request received from a remote device (e.g., a networked server) via a communication network (e.g., via the Internet). The method 400 may additionally, for example, begin executing in response to a timer.

At block 410, the proof mass drive circuit may be turned on or turned up (e.g., to a higher amplitude). For example, as discussed herein, the gyroscope proof mass may be at rest (e.g., not driven) when the gyroscope circuitry is not being utilized. Block 410 may, for example, drive the proof mass toward a desired oscillating amplitude.

Though the example method 400 is generally discussed turning the proof mass drive on at step 410 and off at step 440, it should be understood that such steps need not turn the proof mass drive circuitry fully on or fully off. For example, block 410 may comprise increasing the drive level (e.g., amplitude) relative to a present drive level. The amount of such an increase may, for example, be determined based on whether the proof mass is at rest, whether the amplitude of the proof mass oscillation is presently bouncing between an upper and lower limit, etc. Similarly, block 440 (discussed below) may comprise decreasing the drive level (e.g., amplitude) relative to a present drive level. The amount of such a decrease may, for example, be determined based on whether use of the gyroscope is likely ending soon, whether the amplitude of the proof mass oscillation is presently bouncing between an upper and lower limit, etc.

At block 420, the proof mass oscillation amplitude is determined. Block 420 may, for example, share any or all characteristics with block 310 of FIG. 3. For example, in an example implementation, block 420 and block 310 may be the same block in simultaneously or concurrently executing method flows.

At block 430, a determination is made whether the proof mass oscillation amplitude has reached a maximum desired amplitude of a desired amplitude range. For example, if the amplitude is determined to be less than a maximum amplitude threshold (e.g., $D_{max}$), block 430 may determine that the amplitude has not yet reached a level at which the drive circuitry may be shut off or operated at a reduced level. For example, below the maximum amplitude threshold, there is still room to increase the amplitude. If it is determined that the amplitude has not yet reached the maximum of the desired range, block 430 may direct execution flow of the method 400 back up to step 420, for continued proof mass driving. As explained herein, Coriolis sensing may be performed at this time (see, e.g., blocks 330-350), for example so long as at least a minimum desired proof mass oscillation amplitude exists.

If it is determined, however, that the amplitude is at the maximum of the desired range, block 430 may direct execution flow of the method 400 to block 440. At block 440, the proof mass drive circuitry may be turned off, or at least turned down, to allow the oscillation amplitude of the proof mass to decay. As explained herein, while the amplitude is decaying, Coriolis sensing may be performed at this time, for example so long as at least a minimum desired proof mass oscillation amplitude exists. As discussed herein, for example with reference to FIGS. 1 and 2, the drive sense amplifier 120/220 and/or phase detector 125/225 may still be operational when the proof mass is not being driven or is being driven as a reduced level. Also, for example as discussed herein with reference to FIGS. 1 and 2, an oscillator (e.g., a phase lock loop) may be utilized to provide a reference signal for demodulation of the Coriolis sense signal, even when the drive circuitry is shut down.

At block 450, as in block 420 and/or block 310, the proof mass oscillation amplitude is determined. Block 450 may, for example, share any or all characteristics with block 420 and/or of block 310 of FIG. 3. For example, in an example implementation, block 450 and block 310 may be the same block in simultaneously or concurrently executing method flows.

At block 460, a determination is made whether the proof mass oscillation amplitude has decayed to a minimum desired amplitude of a desired amplitude range. For example, if the amplitude is determined not to have decayed to the minimum amplitude threshold (e.g., $D_{min}$), block 460 may determine that the amplitude has not yet reached a level at which the drive circuitry should be turned back on (or turned up). For example, above the minimum amplitude threshold, there is still room for the amplitude to decay. If it is determined that the amplitude has not yet decayed to the minimum of the desired range, block 460 may direct execution flow of the method 400 back up to step 450, for continued proof mass sensing. As explained herein, Coriolis sensing may be performed at this time, for example so long as at least a minimum desired proof mass oscillation amplitude exists.

If it is determined, however, that the proof mass oscillation amplitude has decayed to the minimum of the desired range, block 460 may direct execution flow of the method 400 back up to block 410. At block 410, the proof mass drive circuitry may be turned back on (or turned up) to drive the proof mass up toward the maximum desired amplitude (or some other amplitude in the operable range). As explained herein, while the amplitude is then building, Coriolis sensing may be performed at this time, for example so long as at least a minimum desired proof mass oscillation amplitude exists. Note that the method 400 may stop in response to any of a variety of causes or conditions. For example, it may be determined that the gyroscope is no longer needed (e.g., an application or subroutine thereof may end, a user may press an "off" button, an operating system may communicate a signal indicating that the gyroscope is no longer needed, a remote server may communicate a signal via a communication network indicating that the gyroscope is no longer needed, etc.).

The example method 400 generally corresponds to the proof mass drive trajectory shown in FIG. 2B, where for example the proof mass oscillation amplitude bounces between maximum and minimum amplitudes. Various blocks may be modified, subtracted, and/or added, for example, to implement any or all portions of the example proof mass drive trajectories illustrated in FIGS. 1B, 2B, 2C, and/or others.

Note that although FIG. 4 and FIG. 3 are presented independently, the functionality associated therewith, or any of the functionality discussed herein, need not be operated independently. For example, method execution may flow between any of the blocks of the methods 300 and 400. Also for example, an overall control program may simultaneously or concurrently control operation of both of the methods 400.

In accordance with various aspects of this disclosure, different proof mass drive trajectories and associated Coriolis sense functionality may be performed. For example, a MEMS gyroscope system may operate in different modes depending on the performance requirements required by a particular application. Each different mode may, for example, utilize a same or different respective proof mass drive trajectory.

Figure 5:
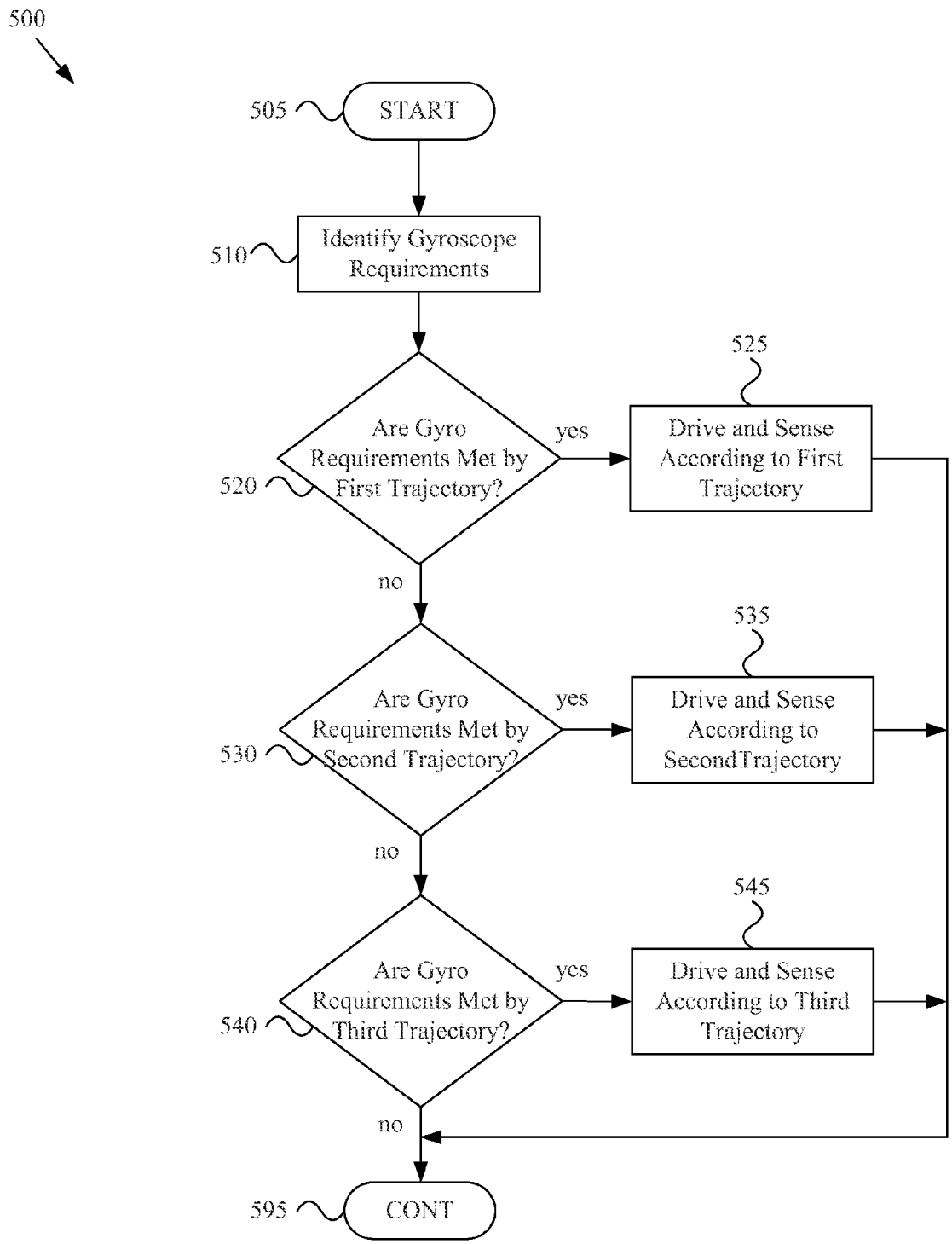
FIG. 5 shows a flow diagram of an example method for adaptively operating MEMS Gyroscope drive and sense circuitry, in accordance with various aspects of the present disclosure.

FIG. 5 shows a flow diagram of an example method 500 for adaptively operating MEMS Gyroscope drive and sense circuitry, in accordance with various aspects of the present disclosure. The example method 500 may, for example, share any or all characteristics with the other example methods and/or functionality discussed herein, for example with regard to FIGS. 1-4 and/or any other methods or functionality. The example method 500 or any portion thereof may, for example, execute in parallel and/or in series with any of the functionality discussed herein. Any or all blocks of the method 500 may, for example, be implemented by any one or more of the components of the example MEMS gyroscope circuit 200 of FIG. 2 (e.g., the AGC circuit 230, drive amplifier 240, mixer 235, etc.) or circuit 100 of FIG. 1.

The example method 500 starts at block 505. The method 500 may begin executing in response to any of a variety of causes or conditions. For example, the method 500 may begin executing in response to an application and/or subroutine thereof beginning execution (e.g., executing in a sensor chip, in an application processor of an electronic device utilizing the gyroscope, etc.). The method 500 may also, for example, begin executing in response to a request received from a remote device (e.g., a networked server) via a communication network (e.g., via the Internet). The method 500 may additionally, for example, begin executing in response to a timer.

At block 510, the method 500 may comprise identifying gyroscope requirements (e.g., performance requirements). For example, a first application may require a first level of gyroscope performance (e.g., first minimum accuracy, first minimum response time, etc.), a second application may require a second level of gyroscope performance (e.g., second minimum accuracy that is the same as or different from the first minimum accuracy, second minimum response time that is the same as or different from the first minimum response time, etc.), and so on. Note that the gyroscope requirements, for example for an application or for a device in general, may be user and/or factory configurable.

Additionally, block 510 may comprise determining gyroscope requirements based, at least in part, on power supply characteristics. For example, in a scenario in which a device utilizing the gyroscope is receiving energy from an automobile or a wall outlet, or when the battery of the device is fully charged, block 510 may determine relatively high requirements for the gyroscope. Conversely, in a scenario in which a device is running low on power, block 510 may determine relatively low requirements for the gyroscope, enabling loser control of the gyroscope proof mass and thus energy savings.

At block 520, the method 500 may comprise determine whether the gyroscope requirements are met by operating the gyroscope in accordance with a first proof mass drive profile and/or Coriolis sensing profile. For example, the first trajectory may be associated with a lowest power consumption of a plurality of trajectories. If block 520 determines that the first trajectory meets the gyroscope requirements, block 520 may direct execution flow of the method 500 to block 525 for driving the proof mass and performing Coriolis sensing in accordance with a first proof mass drive trajectory and corresponding Coriolis sensing strategy. If, however, the block 520 determines that the first trajectory does not meet the gyroscope requirements, then block 520 may direct execution flow of the method 500 to block 530 for repeating the determination with regard to a second proof mass drive trajectory and/or Coriolis sensing strategy.

At block 530, the method 500 may comprise determining whether the gyroscope requirements are met by operating the gyroscope in accordance with a second proof mass drive profile and/or Coriolis sensing profile. For example, the second trajectory may be associated with a second lowest power consumption of a plurality of trajectories. If block 530 determines that the second trajectory meets the gyroscope requirements, block 530 may direct execution flow of the method 500 to block 535 for driving the proof mass and/or performing Coriolis sensing in accordance with the second proof mass drive trajectory and corresponding Coriolis sensing strategy. If, however, the block 530 determines that the second trajectory does not meet the gyroscope requirements, then block 530 may direct execution flow of the method 500 to block 540 for repeating the determination with regard to a third proof mass drive trajectory and Coriolis sensing strategy.

At block 540, the method 500 may comprise determining whether the gyroscope requirements are met by operating the gyroscope in accordance with a third proof mass drive profile and/or Coriolis sensing profile. For example, the third trajectory may be associated with a third lowest power consumption of a plurality of trajectories. If block 540 determines that the third trajectory meets the gyroscope requirements, block 540 may direct execution flow of the method 500 to block 545 for driving the proof mass and/or performing Coriolis sensing in accordance with the third proof mass drive trajectory and corresponding Coriolis sensing strategy. If, however, the block 540 determines that the third trajectory does not meet the gyroscope requirements, then block 540 may direct execution flow of the method 500 to block 595 for continued operation, for example repeating the determination with regard to a fourth proof mass drive trajectory and Coriolis sensing strategy and so on.

It should be noted that, although the discussion herein generally focuses on driving and sensing with regard to a single MEMS gyroscope proof mass, the various aspects discussed herein extend to all proof masses of the gyroscope (e.g., x-axis, y-axis, z-axis, etc.). Additionally, it should be noted that, although the discussion herein generally focuses on a MEMS gyroscope example, the various aspects discussed herein also apply to other MEMS sensors that include a driven proof mass.

In general, the present disclosure presents a system and/or method for efficiently operating a MEMS gyroscope without drive circuitry and/or with drive circuitry and a non-constant oscillating amplitude. Various non-limiting examples are provided herein. While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. Therefore, it is intended that the present method and/or system not be limited to the particular implementations disclosed, but that the present method and/or system will include all implementations falling within the scope of the appended claims.

The invention claimed is:

1. A MEMS gyroscope comprising:
    a proof mass;
    a proof mass drive circuit operable to increase an oscillation amplitude of the proof mass during a first time period and allow the oscillation amplitude of the proof mass to decrease during a second time period; and
    a first sense circuit operable to determine a rotational velocity value during at least a portion of the second time period and during at least a portion of the first time period, when the MEMS gyroscope is in a low power mode.

2. The MEMS gyroscope of claim 1, wherein the proof mass drive circuit is operable to allow the oscillation amplitude of the proof mass to decrease during the second time period by, at least in part, refraining from driving the proof mass.

3. The MEMS gyroscope of claim 1, wherein:
    the proof mass drive circuit is operable to increase the oscillation amplitude of the proof mass during the first time period by, at least in part, operating to generate a first drive signal characterized by a first drive signal amplitude; and
    the proof mass drive circuit is operable to allow the oscillation amplitude of the proof mass to decrease during the second time period by, at least in part, operating to generate a second drive signal characterized by a second drive signal amplitude that is less than the first drive signal amplitude.

4. The MEMS gyroscope of claim 3, wherein the second drive signal amplitude is non-zero.

5. The MEMS gyroscope of claim 1, wherein the first sense circuit comprises a first sense amplifier, a gain of which is adjusted during the second time period based, at least in part, on the oscillation amplitude of the proof mass.

6. The MEMS gyroscope of claim 5, comprising a drive sense circuit operable to sense the oscillation amplitude of the proof mass.

7. The MEMS gyroscope of claim 6, wherein the first sense circuit and the drive sense circuit utilize different respective electrodes to sense motion of the proof mass.

8. The MEMS gyroscope of claim 7, wherein the drive sense circuit is operable to sense the oscillation amplitude of the proof mass based, at least in part, on a quadrature component of a sensor signal.

9. The MEMS gyroscope of claim 1, wherein the first sense circuit is operable to sense rotational velocity during at least a portion of the first time period.

10. The MEMS gyroscope of claim 1, comprising at least one module operable to determine whether to sense rotational velocity based, at least in part, on the oscillation amplitude of the proof mass.

11. The MEMS gyroscope of claim 1, comprising at least one module operable to select a proof mass drive trajectory from a plurality of proof mass drive trajectories.

12. The MEMS gyroscope of claim 11, wherein the at least one module is operable to select the proof mass drive trajectory from the plurality of proof mass drive trajectories based, at least in part, on gyroscope requirements.

13. The MEMS gyroscope of claim 11, wherein the at least one module is operable to select the proof mass drive trajectory from the plurality of proof mass drive trajectories based, at least in part, on power supply characteristics.

14. A MEMS gyroscope comprising:
    a proof mass;
    a proof mass drive circuit operable to drive the proof mass during a first time period and refrain from driving the proof mass during a second time period; and
    a first sense circuit operable to determine a rotational velocity value during at least a portion of the second time period and during at least a portion of the first time period, when the MEMS gyroscope is in a low power mode.

15. The MEMS gyroscope of claim 14, wherein the first sense circuit is operable to sense rotational velocity during at least a portion of the first time period.

16. The MEMS gyroscope of claim 14, wherein the first sense circuit comprises a first sense amplifier, a gain of which is adjusted during the second time period based, at least in part, on the oscillation amplitude of the proof mass.

17. The MEMS gyroscope of claim 16, comprising a drive sense circuit operable to sense the oscillation amplitude of the proof mass.

18. The MEMS gyroscope of claim 14, comprising at least one module operable to determine whether to sense rotational velocity based, at least in part, on an oscillation amplitude of the proof mass.

19. The MEMS gyroscope of claim 14, comprising a drive sense amplifier and wherein, during at least a portion of the second time period, the drive sense amplifier operates to output a signal utilized by the first sense circuit to demodulate a Coriolis sense signal.

20. The MEMS gyroscope of claim 14, comprising a drive sense amplifier and an oscillator, and wherein, during at least a portion of the second time period, the drive sense amplifier is turned off and the oscillator operates to output a signal utilized by the first sense circuit to demodulate a Coriolis sense signal.

21. A MEMS gyroscope comprising:
a proof mass;
a proof mass drive circuit operable to increase an oscillation amplitude of the proof mass during a first time period, maintain the oscillation amplitude of the proof mass during a second time period, and allow the oscillation amplitude of the proof mass to decrease during a third time period; and
a sense circuit operable to determine a rotational velocity value during at least a portion of the first time period, during the second time period, and during at least a portion of the third time period, when the MEMS gyroscope is in a low power mode.

22. The MEMS gyroscope of claim 21, wherein the first sense circuit comprises a first sense amplifier, a gain of which is adjusted during at least a portion of the first time period and during at least a portion of the third time period based, at least in part, on the oscillation amplitude of the proof mass.

23. A MEMS gyroscope comprising:
a proof mass;
a proof mass drive circuit operable to increase an oscillation amplitude of the proof mass during a first time period and allow the oscillation amplitude of the proof mass to decrease during a second time period; and
a first sense circuit operable to determine a rotational velocity value during at least a portion of the first time period when the MEMS gyroscope is in a low power mode.

* * * * *